(12) United States Patent
Nakagawa et al.

(10) Patent No.: US 7,843,453 B2
(45) Date of Patent: Nov. 30, 2010

(54) VIDEO GENERATION DEVICE, LOAD DISPLAY METHOD, RECORDING MEDIUM, AND PROGRAM

(75) Inventors: Jun Nakagawa, Tokyo (JP); Yutaka Ito, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 521 days.

(21) Appl. No.: 11/574,574

(22) PCT Filed: Sep. 1, 2005

(86) PCT No.: PCT/JP2005/016023

§ 371 (c)(1),
(2), (4) Date: Mar. 1, 2007

(87) PCT Pub. No.: WO2006/025495

PCT Pub. Date: Mar. 9, 2006

(65) Prior Publication Data

US 2008/0094390 A1    Apr. 24, 2008

(30) Foreign Application Priority Data

Sep. 3, 2004    (JP)    ............................... 2004-257260

(51) Int. Cl.
*G06T 13/00* (2006.01)
*G06T 15/70* (2006.01)
*G09G 5/00* (2006.01)
*H02M 7/06* (2006.01)

(52) U.S. Cl. ............................. 345/473; 345/581; 463/6
(58) Field of Classification Search .................. 345/440, 345/581, 473; 463/6
See application file for complete search history.

(56) References Cited

U.S. PATENT DOCUMENTS 5,755,620 A * 5/1998 Yamamoto et al. ............ 463/34

(Continued)

FOREIGN PATENT DOCUMENTS

JP    08137380 A    5/1996

(Continued)

OTHER PUBLICATIONS

Supplementary European Search Report for Application No. 05781341.2, PCT/JP2005016023, dated Nov. 13, 2007, 8 pages total.
"Enthusia Professional Racing," 'G' Taikan System 'VGS' o Tosai!! Dengeki Playstation vol. 273, Media Works Inc., (Jun. 11, 2004), vol. 10, No. 15, whole No. 269, pp. 254-255.

(Continued)

*Primary Examiner*—Ryan R Yang
(74) *Attorney, Agent, or Firm*—Townsend and Townsend and Crew LLP

(57) ABSTRACT

An operation input reception unit (201) receives an operation input for a virtual vehicle to be run on the running path. Further, a running condition managing unit (203) manages the running condition of the virtual vehicle based on the received operation input. Then, a video generation unit (204) generates a front image appearing in front of the virtual vehicle, based on image information stored in an image information storage unit (202) and the managed running condition. Meanwhile, a load calculation unit (205) calculates a load to be imposed on the virtual vehicle, based on the managed running condition. Further, a tire drawing unit (206) draws a tire image whose shape is changed according to the calculated load. Then, a display control unit (208) synthesizes the generated front image and the tire image, and displays the synthesized image.

9 Claims, 14 Drawing Sheets

U.S. PATENT DOCUMENTS

| | | | |
|---|---|---|---|
| 7,145,442 B1 * | 12/2006 | Wai | 340/438 |
| 2003/0055617 A1 * | 3/2003 | Iwasaki et al. | 703/2 |
| 2004/0058730 A1 | 3/2004 | Ouchi | |
| 2005/0090302 A1 | 4/2005 | Campbell | |
| 2005/0280521 A1 | 12/2005 | Mizumaki | |

FOREIGN PATENT DOCUMENTS

| | | | |
|---|---|---|---|
| JP | 08276074 A | 10/1996 | |
| JP | 11114222 A | 4/1999 | |
| JP | 11146978 A | 6/1999 | |
| JP | 3556660 | 5/2004 | |
| JP | 03 556660 B1 | 8/2004 | |
| JP | 3556660 B1 * | 8/2004 | |

OTHER PUBLICATIONS

Kinkyu Sokuho Enthusia, Shukan Fami Tsu, 'Gazo Joho Mansai!! "VGS" System o Tosai,' 5 Gatsu 14, 21 Nichi Gappeigo, Enterbrain, Inc., (May 21, 2004), vol. 19, No. 21, whole No. 805, pp. 37-39.
International Search Report and Written Opinion PCT/JP2005/016023 dated Nov. 8, 2005, 5 pages.

* cited by examiner

RUNNING CONDITIONS OF RACING CAR OPERATED BY USER

| CURRENT POSITION | RUNNING DIRECTION | VELOCITY | STEERING ANGLE | ACCELERATING CONDITION | DECELERATING CONDITION | RIGHT TURNING CONDITION | LEFT TURNING CONDITION | ... |
|---|---|---|---|---|---|---|---|---|
| (x1, y1, z1) | (xa, yb, zc) | 250 | 0 | 10 | — | — | — | ... |

FIG. 3A

RUNNING CONDITIONS OF OTHER RACING CARS

| VEHICLE ID | CURRENT POSITION | RUNNING DIRECTION | VELOCITY | STEERING ANGLE | ACCELERATING CONDITION | DECELERATING CONDITION | RIGHT TURNING CONDITION | LEFT TURNING CONDITION | ... |
|---|---|---|---|---|---|---|---|---|---|
| 001 | (x2, y2, z2) | (x2, y2, z3) | 200 | +20 | — | — | 15 | — | ... |
| 002 | (x3, y3, z3) | (x2, y2, z3) | 130 | 0 | — | 20 | — | — | ... |
| 003 | (x4, y4, z4) | (x2, y2, z3) | 110 | −25 | — | — | — | 20 | ... |
| 004 | (x5, y5, z5) | (x2, y2, z3) | 190 | 0 | 20 | — | — | — | ... |

FIG. 3B

VIDEO GENERATION DEVICE, LOAD DISPLAY METHOD, RECORDING MEDIUM, AND PROGRAM

TECHNICAL FIELD

The present invention relates to a video generation device, a load display method, a recording medium and a program which are suitable for easy grasp of the behaviors of a virtual vehicle, with appropriate visualization of a load according to a running condition.

BACKGROUND ART

Conventionally, game devices for business use and home use have been widely spread. With such a game device, for example, one can enjoy a race game by a vehicle such as a car, etc.

In such a race game, for example, the user (player) typically operates a controller or the like, and drives a virtual vehicle (an F1 machine, a stock car, or the like), which runs in a virtual space, to a predetermined goal point, vying for the time taken or vying with other vehicles for earlier arrival.

Further, a technique for a race game device which enables even a user not experienced in game operations to enjoy a race game with relatively simple operations, has also been disclosed (for example, see Patent Literature 1).

Patent Literature 1: Unexamined Japanese Patent Application KOKAI Publication No. H11-114222 (pp. 2-3, FIG. 1)

DISCLOSURE OF INVENTION

Problem to be Solved by the Invention

However, in most cases, conventional game devices, which have provided joyful race game experiences, have not been able to make the behaviors of the virtual vehicle sufficiently graspable during the play.

Specifically, if in a real vehicle, the driver, etc. feel a backward load or a forward load because an inertia force acts in acceleration or deceleration, etc. Further, when turning at a corner, etc., the driver, etc. feel a load that is reverse to the turning direction because a centrifugal force acts. By feeling such loads, the driver, etc. can easily grasp the behavior of the vehicle and running conditions.

In contrast, in playing a race game, there is a problem that the user cannot feel any kind of load from the displayed image, and cannot therefore sufficiently grasp the behavior of the virtual vehicle.

The present invention was made to solve such a problem, and an object of the present invention is to provide a video generation device, a load display method, and a recording medium which enable easy grasp of the behaviors of a virtual vehicle, by appropriately visualizing a load according to a running condition, and a program for realizing these on a computer.

Means for Solving the Problem

A video generation device according to a first aspect of the present invention comprises an operation input reception unit, a front image generation unit, a tire image generation unit, and a display control unit, which are configured as follows.

First, the operation input reception unit receives an operation input for a virtual vehicle to be run in a virtual space. Further, the front image generation unit generates a front image (for example, a driver's view, etc.) which appears in front of the virtual vehicle, which runs according to the operation input received.

Meanwhile, the tire image generation unit generates a tire image whose shape is changed according to a load based on a running condition of the virtual vehicle. Then, the display control unit synthesizes the generated front image and the tire image, and displays the synthesized image.

Accordingly, since the shape of the tire image changes according to the load based on the running condition of the virtual vehicle, the user will feel the load imposed on the virtual vehicle, from the tire image. As a result, it is possible to enable easy grasp of the behavior of the virtual vehicle, by appropriately visualizing the load according to the running condition.

Further, the tire image generation unit may generate a planar tire image in which a vertical width or a horizontal width of tires is changed according to the load.

As an example, the tire image generation unit enlarges the vertical width of the front tires on the left and right when the running condition is decelerating, and enlarges the horizontal with of the front and rear tires on the right/left when the running condition is a left/right turning situation.

That is, since the vertical width or the horizontal width of the tire image is changed according to the load based on the running condition, the user will feel the load imposed on the virtual vehicle, from the tire image. As a result, it is possible to enable easy grasp of the behavior of the virtual vehicle, by appropriately visualizing the load according to the running condition.

A video generation device according to a second aspect of the present invention comprises an image information storage unit, an operation input reception unit, a running condition managing unit, a front image generation unit, a load calculation unit, a tire image generation unit, and a display control unit, which are configured as follows.

First, the image information storage unit stores image information including a scenery image to be arranged in a virtual space. Further, the operation input reception unit receives an operation input for a virtual vehicle to be run in the virtual space. Further, the running condition managing unit manages a running condition of the virtual vehicle based on the received operation input. Then, the front image generation unit generates a front image (for example, a driver's view, etc.) which appears in front of the virtual vehicle, based on the stored image information and the managed running condition.

Meanwhile, the load calculation unit calculates a load to be imposed on the virtual vehicle, based on the managed running condition. The tire image generation unit generates a tire image whose shape is changed according to the calculated load. Then, the display control unit synthesizes the generated front image and the tire image, and displays the synthesized image.

Accordingly, since the shape of the tire image changes according to the load based on the running condition of the virtual vehicle, the user will feel the load imposed on the virtual vehicle, from the tire image. As a result, it is possible to enable easy grasp of the behavior of the virtual vehicle, by appropriately visualizing the load according to the running condition.

Further, the load calculation unit may calculate a load to be imposed on the virtual vehicle due to an inertia force in a case where the running condition is acceleration or deceleration, and calculate a load to be imposed on the virtual vehicle due to a centrifugal force in a case where the running condition is turning, and the tire image generation unit may generate a planar tire image in which a vertical width or a horizontal width of tires is changed according to the calculated load.

As an example, the tire image generation unit enlarges the vertical width of the front tires on the left and right when the running condition is decelerating, and enlarges the horizontal with of the front and rear tires on the right/left when the running condition is a left/right turning situation.

That is, since the vertical width or the horizontal width of the tire image is changed according to the load based on the running condition, the user will feel the load imposed on the virtual vehicle, from the tire image. As a result, it is possible to enable easy grasp of the behavior of the virtual vehicle, by appropriately visualizing the load according to the running condition.

A mask image generation unit which generates a mask image whose shape is changed according to the load may further be comprised, and the display control unit may synthesize the generated front image and the mask image, and after this, further synthesize the tire image.

In this case, since the display manner of the front view on the screen is also changed according to the load based on the running condition, the user can feel the load also from this front view on the screen.

A load display method according to a third aspect of the present invention is a load display method using an image information storage unit (which stores image information including a scenery image to be arranged in a virtual space), and comprises an operation input receiving step, a front image generating step, a tire image generating step, and a display controlling step, which are configured as follows.

First, at the operation input receiving step, an operation input for a virtual vehicle to be run in a virtual space is received. Further, at the front image generating step, a front image (for example, a driver's view, etc.) which appears in front of the virtual vehicle, which runs according to the received operation input, is generated based on the stored image information.

Meanwhile, at the tire image generating step, a tire image whose shape is changed according to a load based on a running condition of the virtual vehicle is generated. Then, at the display controlling step, the generated front image and the tire image are synthesized on a predetermined display device, and the synthesized image is displayed thereon.

Accordingly, since the shape of the tire image changes according to the load based on the running condition of the virtual vehicle, the user will feel the load imposed on the virtual vehicle, from the tire image. As a result, it is possible to enable easy grasp of the behavior of the virtual vehicle, by appropriately visualizing the load according to the running condition.

A load display method according to a fourth aspect of the present invention is a load display method using an image information storage unit (which stores image information including a scenery image to be arranged in a virtual space), and comprises an operation input receiving step, a running condition managing step, a front image generating step, a load calculating step, a tire image generating step, and a display controlling step, which are configured as follows.

First, at the operation input receiving step, an operation input for a virtual vehicle to be run in a virtual space is received. Further, at the running condition managing step, a running condition of the virtual vehicle is managed based on the received operation input. Then, at the front image generating step, a front image (for example, a driver's view, etc.) which appears in front of the virtual vehicle is generated based on the stored image information and the managed running condition.

Meanwhile, at the load calculating step, a load to be imposed on the virtual vehicle is calculated based on the managed running condition. Further, at the tire image generating step, a tire image whose shape is changed according to the calculated load is generated. Then, at the display controlling step, the generated front image and the tire image are synthesized and the synthesized image is displayed.

Accordingly, since the shape of the tire image changes according to the load based on the running condition of the virtual vehicle, the user will feel the load imposed on the virtual vehicle, from the tire image. As a result, it is possible to enable easy grasp of the behavior of the virtual vehicle, by appropriately visualizing the load according to the running condition.

A program according to a fifth aspect of the present invention controls a computer (including a game device) to function as the above-described video generation device.

This program can be stored on a computer-readable information recording medium such as a compact disk, a flexible disk, a hard disk, a magneto optical disk, a digital video disk, a magnetic tape, a semiconductor memory, etc.

The above-described program can be distributed and sold via a computer communication network, independently from a computer on which the program is executed. Further, the above-described information recording medium can be distributed and sold independently from the computer.

EFFECT OF THE INVENTION

According to the present invention, it is possible to enable easy grasp of the behavior of the virtual vehicle, by appropriately visualizing the load according to the running condition.

BRIEF DESCRIPTION OF DRAWINGS

[FIG. 3A] It is an exemplary diagram showing an example of information managed by a running condition managing unit of the video generation device.

[FIG. 3B] It is an exemplary diagram showing an example of information managed by the running condition managing unit of the video generation device.

Figure 1:
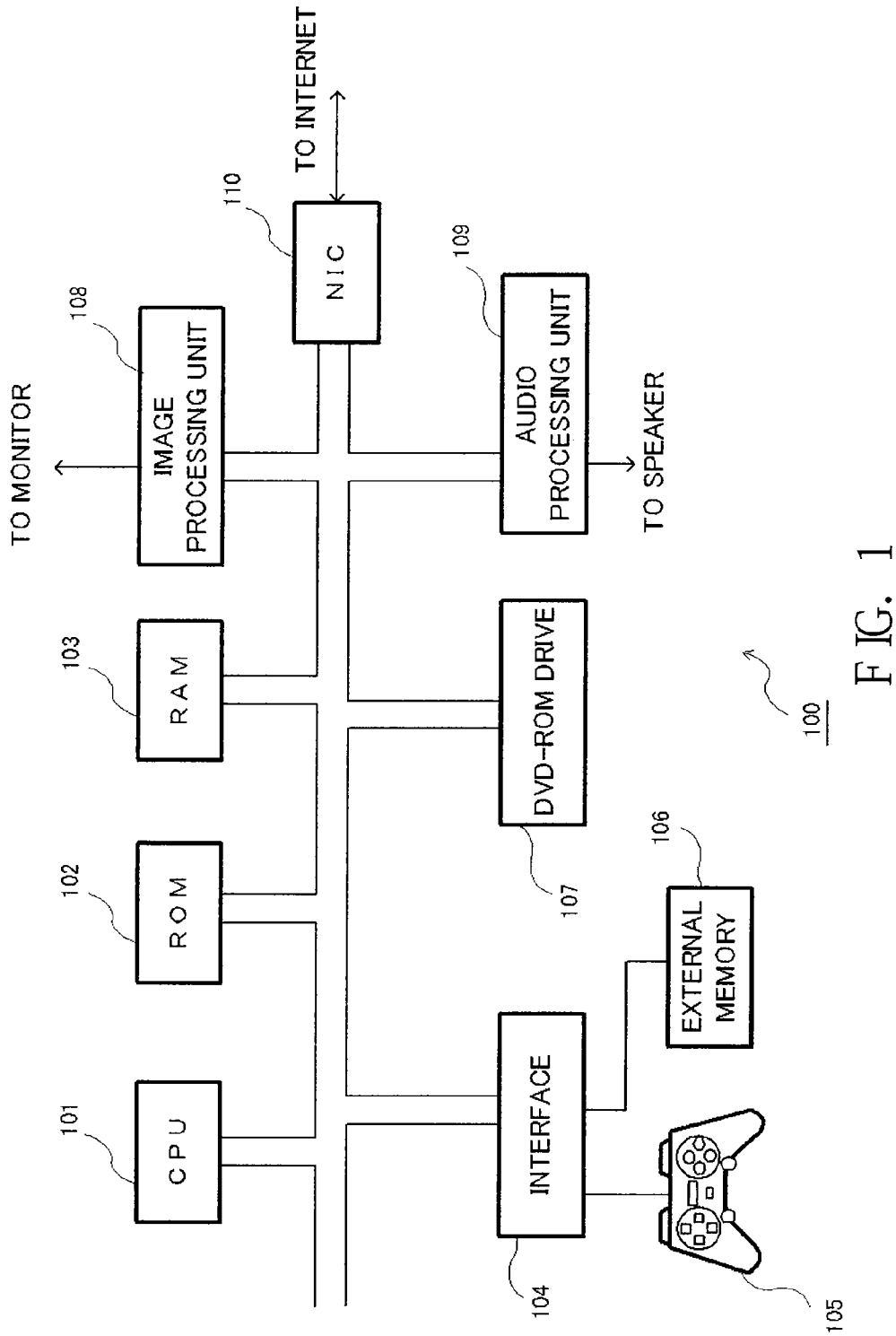
[FIG. 1] It is an exemplary diagram showing a schematic structure of a typical game device on which a video generation device according to an embodiment of the present invention is realized.

EXPLANATION OF REFERENCE NUMERALS 100 game device
101 CPU
102 ROM
103 RAM
104 interface
105 controller
106 external memory
107 DVD-ROM drive
108 image processing unit
109 audio processing unit
110 NIC
200 video generation device
201 operation input reception unit
202 image information storage unit
203 running condition managing unit
204 video generation unit
205 load calculation unit
206 tire drawing unit
207 frame buffer
208 display control unit

BEST MODE FOR CARRYING OUT THE INVENTION

Embodiment 1

FIG. 1 is an exemplary diagram showing a schematic structure of a typical game device on which a video generation device according to an embodiment of the present invention will be realized. The following explanation will be given with reference to this diagram.

A game device 100 comprises a CPU (Central Processing Unit) 101, a ROM (Read Only Memory) 102, a RAM (Random Access Memory) 103, an interface 104, a controller 105, an external memory 106, a DVD (Digital Versatile Disk)-ROM drive 107, an image processing unit 108, an audio processing unit 109, and an NIC (Network Interface Card) 110.

By loading a DVD-ROM storing a game program and data onto the DVD-ROM drive 107 and turning on the power of the game device 100, the program will be executed and the video generation device according to the present embodiment will be realized.

The CPU 101 controls the operation of the entire game device 100, and is connected to each element to exchange control signals and data.

The ROM 102 stores an IPL (Initial Program Loader) to be executed immediately after the power is turned on, execution of which triggers the program stored on the DVD-ROM to be read into the RAM 103 and executed by the CPU 101. Further, the ROM 102 stores a program and various data for an operating system necessary for controlling the operation of the entire game device 100.

The RAM 103 is for temporarily storing data and programs, and retains the program and data read out from the DVD-ROM, and other data necessary for game proceedings and chat communications.

The controller 105 connected through the interface 104 receives an operation input given by the user when playing the game.

The external memory 106 detachably connected through the interface 104 rewritably stores data indicating the progress status of the game, data of chat communication logs (records), etc. The user can store these data on the external memory 106 where needed, by inputting instructions through the controller 105.

The DVD-ROM to be loaded on the DVD-ROM drive 107 stores a program for realizing the game and image data and audio data accompanying the game. Under the control of the CPU 101, the DVD-ROM drive 107 performs a reading process on the DVD-ROM loaded thereon to read out a necessary program and data, which are to be temporarily stored on the RAM 103, etc.

The image processing unit 108 processes the data read out from the DVD-ROM by means of the CPU 101 and an image calculation processor (unillustrated) provided in the image processing unit 108, and thereafter stores the data in a frame memory (unillustrated) provided in the image processing unit 108. The image information stored in the frame memory is converted into a video signal at a predetermined synchronization timing and output to a monitor (unillustrated) connected to the image processing unit 108. Thereby, image displays of various types are available.

Note that the image calculation processor can rapidly perform transparent operations such as overlay operation or α blending of two-dimensional images, and saturate operations of various types.

Further, the image calculation processor can also rapidly perform an operation for rendering, by a Z buffer method, polygon information placed in a virtual three-dimensional space and having various texture information added, to obtain a rendered image of the polygon placed in the virtual three-dimensional space as seen from a predetermined view position.

Further, by the CPU 101 and the image calculation processor working in cooperation, a character string as a two-dimensional image can be depicted on the frame memory, or depicted on the surface of each polygon, according to font information defining the shape of the characters. The font information is stored in the ROM 102, but specially-prepared font information stored on the DVD-ROM may be used.

The audio processing unit 109 converts audio data read out from the DVD-ROM into an analog audio signal, and outputs the signal from a speaker (unillustrated) connected thereto. Further, under the control of the CPU 101, the audio processing unit 109 generates sound effects and music data to be sounded in the course of the game, and outputs the sounds corresponding to the data from the speaker.

The NIC 110 is for connecting the game device 100 to a computer communication network (unillustrated) such as the Internet, etc., and comprises a 10BASE-T/100BASE-T product used for building a LAN (Local Area Network), an analog modem, an ISDN (Integrated Services Digital Network) modem, or an ADSL (Asymmetric Digital Subscriber Line) modem for connecting to the Internet by using a telephone line, a cable modem for connecting to the Internet by using a cable television line, or the like, and an interface (unillustrated) for intermediating between these and the CPU 101.

Aside from the above, the game device 100 may be configured to perform the same functions as the ROM 102, the RAM 103, the external memory 106, the DVD-ROM to be loaded on the DVD-ROM drive 107, etc. by using a large-capacity external storage device such as a hard disk, etc.

Further, it is also possible to employ an embodiment where a keyboard for accepting a character string editing input from the user, and a mouse for accepting various position designations and selection inputs from the user are connected.

Furthermore, a general computer (a general-purpose personal computer, etc.) may be used instead of the game device 100 of the present embodiment. For example, a general computer comprises a CPU, a RAM, a ROM, a DVD-ROM drive, and an NIC likewise the above-described game device 100, comprises an image processing unit having simpler functions than those of the game device 100, comprises a hard disk as an external storage device, and can also use a flexible disk, a magneto optical disk, a magnetic tape, etc. Further, such a general computer uses not a controller but a keyboard and a mouse as the input device.

(Schematic Structure of Video Generation Device)

Figure 2:
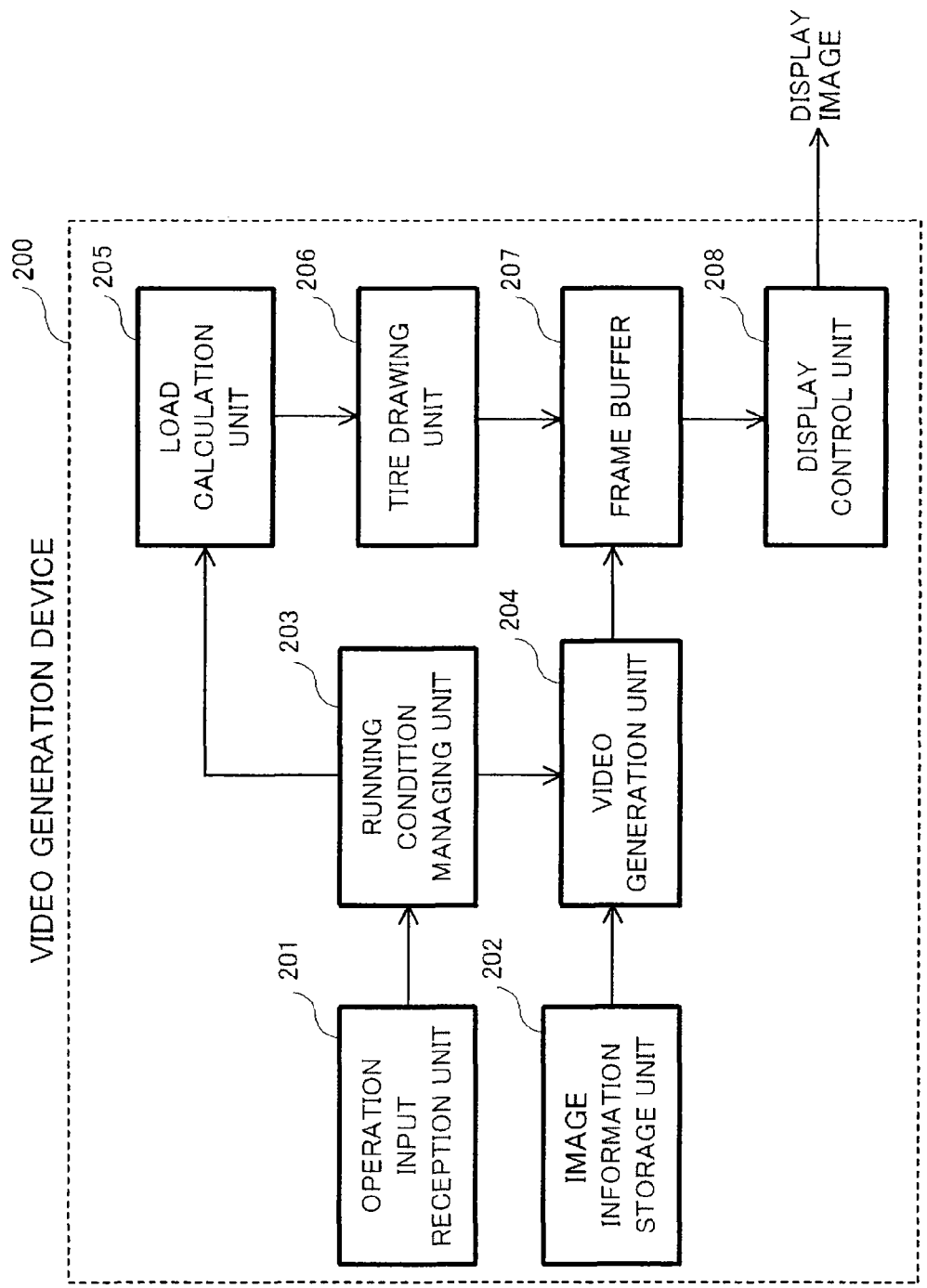
[FIG. 2] It is an exemplary diagram showing a schematic structure of a video generation device according to an embodiment of the present invention.

FIG. 2 is an exemplary diagram showing a schematic structure of the video generation device according to the present embodiment. The following explanation will be given with reference to this diagram.

The video generation device 200 comprises an operation input reception unit 201, an image information storage unit 202, a running condition managing unit 203, a video generation unit 204, a load calculation unit 205, a tire drawing unit 206, a frame buffer 207, and a display control unit 208.

The explanation will be given to a case that the video generation device 200 is applied to a racing game where a racing car or the like, which runs on a circuit within a virtual space, is operated.

First, the operation input reception unit 201 receives an operation input for a racing car (virtual vehicle) which is to be run on a circuit within a virtual space.

For example, the operation input reception unit 201 receives an operation input for a brake operation, an accelerator operation, a steering wheel operation, and a shifter operation, etc. necessary for running the racing car.

The controller 105 can function as the operation input reception unit 201.

The image information storage unit 202 stores image information which defines scenery images, etc. which include the running path on the circuit within the virtual space. Other than this, the image information storage unit 202 stores image information which defines a plurality of racing cars including the racing car to be operated by the user, and etc.

The DVD-ROM loaded on the DVD-ROM drive 107, the external memory 106, etc. can function as such an image information storage unit 202

The running condition managing unit 203 manages the running conditions of the racing car operated by the user, and the running conditions of the other racing cars.

For example, the running condition managing unit 203 manages information which defines the running conditions as shown in FIGS. 3A and 3B.

The information shown in FIG. 3A is information to be updated where necessary, according to operation information of various types sent from the operation input reception unit 201. That is, the running conditions of the racing car operated by the user are managed by the information of FIG. 3A.

The information shown in FIG. 3B is information to be updated automatically based on predetermined logics and parameters. That is, the running conditions of the other racing cars which are run automatically are managed by the information of FIG. 3B.

Further, the running condition managing unit 203 manages contacts and collisions between racing cars, based on the information of FIGS. 3A and 3B.

The CPU 101 can function as such a running condition managing unit 203.

The video generation unit 204 generates the image (image in the proceeding direction) ahead of the racing car operated by the user, based on the image information stored in the image information storage unit 202 and the running conditions managed by the running condition managing unit 203.

Figure 4:
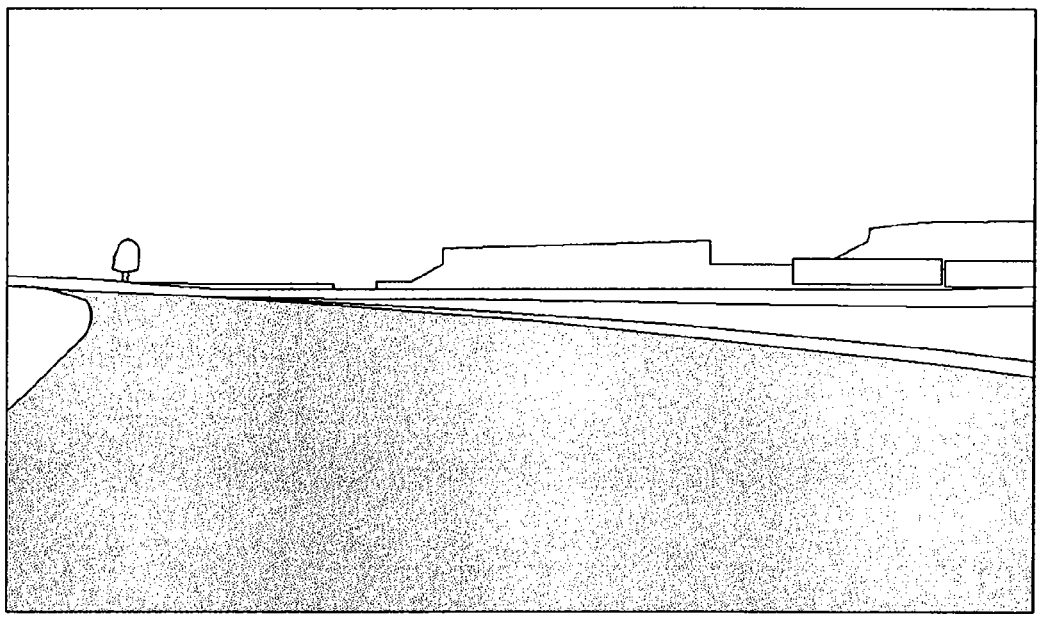
[FIG. 4] It is an exemplary diagram showing an example of a view field image drawn by a video generation unit of the video generation device.

Specifically, the video generation unit 204 depicts a view field image (driver's view) as shown in FIG. 4, which is observed when the view outside the car is seen from the driver's seat of the racing car. Then, the video generation unit 204 writes the depicted view field image in a display area of the frame buffer 207 to be described later.

The image processing unit 108 can function as such a video generation unit 204.

The load calculation unit 205 calculates the load added on the racing car (more specifically, on the two front tires or the two rear tires) operated by the user, based on the running conditions managed by the running condition managing unit 203.

For example, in a case where the running condition managed is acceleration or deceleration, the load calculation unit 205 calculates the load in the forward or backward direction produced due to an inertia force, etc., and the level thereof. Specifically, the load calculation unit 205 calculates, from the direction of the acceleration, the direction of the load which is in a reverse direction to that direction, and calculates the level of the load by multiplying the acceleration and the weight of the racing car (see Equation 1, as an example). The weight of the racing car changes according to the vehicle model, settings, etc., and also varies according to the number of laps which have been run, the status of fuel consumption (full supply of gasoline to reduced supply of gasoline).

$$f = m\alpha \quad \text{(Equation 1)}$$

f: load
m: weight (mass) of the racing car
α: acceleration

Further, in a case where the running condition managed is turning, the load calculation unit 205 calculates the load in the leftward or rightward direction produced due to a centrifugal force, etc., and the level thereof. Specifically, the load calculation unit 205 obtains the turning radius from the steering angle, etc., to calculate the direction toward the center of the circular arc and the direction of the load, and obtains the angular velocity from the velocity and the turning radius to calculate the level of the load by multiplying the second power of the angular velocity by the turning radius and the weight of the racing car (see Equation 2, as an example)

$$f = m\alpha = mr\omega^2 \quad \text{(Equation 2)}$$

f: load
m: weight (mass) of the racing car
α: acceleration
r: turning radius
ω: angular velocity The CPU 101 can function as such a load calculation unit 205.

The tire drawing unit 206 generates images of tires having different shapes, based on the load (direction and level) calculated by the load calculation unit 205.

For example, the tire drawing unit 206 generates planar tire images different in shape, as shown in FIGS. 5A to 5E. These tire images represent the surface of the running path contacted by the tires during running.

Figure 5A:
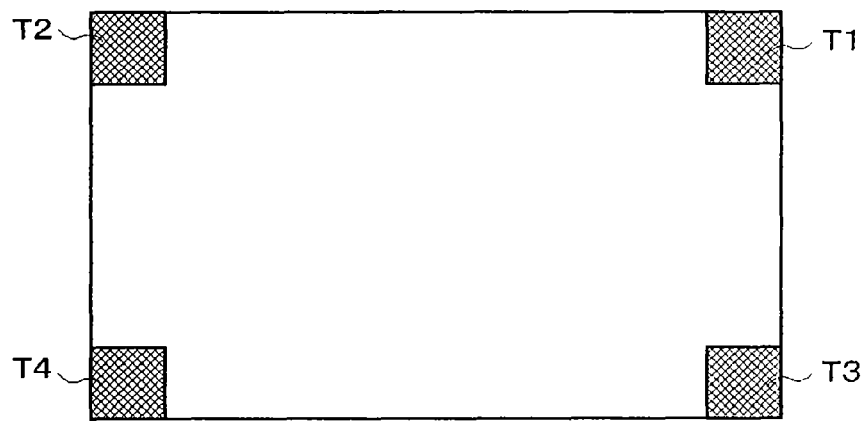
[FIG. 5A] It is an exemplary diagram showing an example of a tire image drawn by a tire drawing unit of the video generation device.

First, the tire image of FIG. 5A is an example to be generated in a case where the load is imposed on the four tires (T1 to T4) on the front and rear uniformly (in case of constant velocity running, etc.). The tire image of FIG. 5B is an example to be generated in a case where the load is imposed on the front tires (T1, T2) on the left and right (in case of deceleration or sudden stop by braking).

Figure 5B:
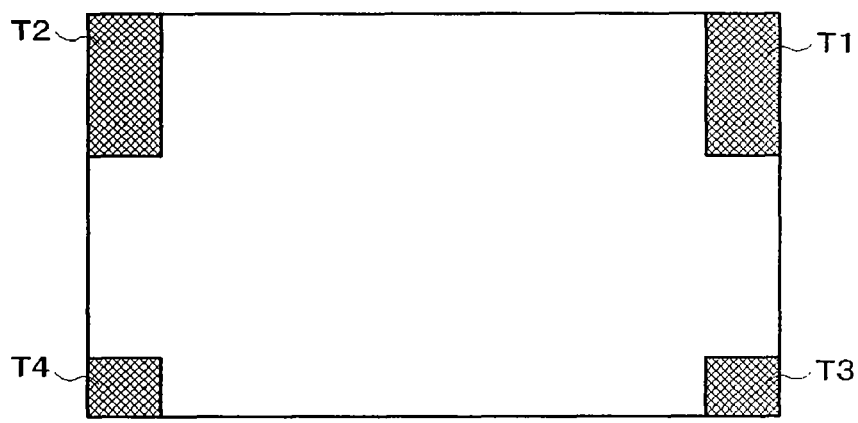
[FIG. 5B] It is an exemplary diagram showing an example of a tire image drawn by the tire drawing unit of the video generation device.
Figure 5C:
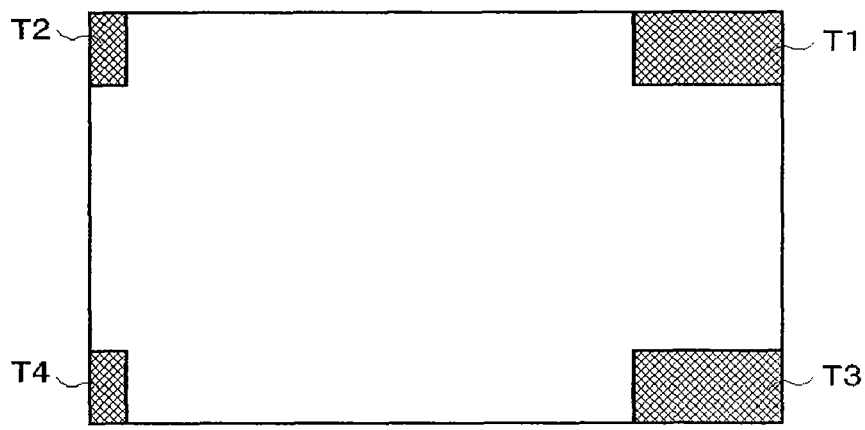
[FIG. 5C] It is an exemplary diagram showing an example of a tire image drawn by the tire drawing unit of the video generation device.
Figure 5D:
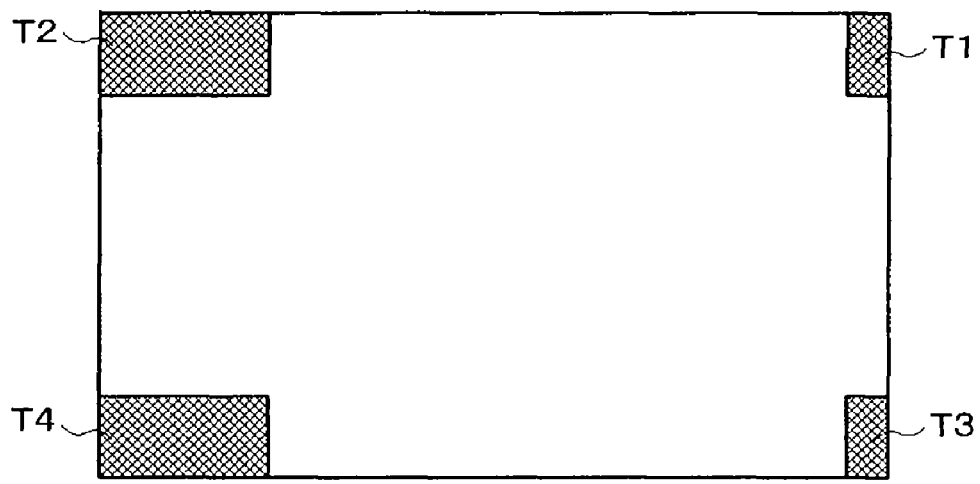
[FIG. 5D] It is an exemplary diagram showing an example of a tire image drawn by the tire drawing unit of the video generation device.

The tire image of FIG. 5C is an example to be generated in a case where the load is imposed on the front and rear tires (T1, T3) on the right (in case of left turn). The tire image of FIG. 5D is an example to be generated in a case where the load is imposed on the front and rear tires (T2, T4) on the left (in case of right turn).

Figure 5E:
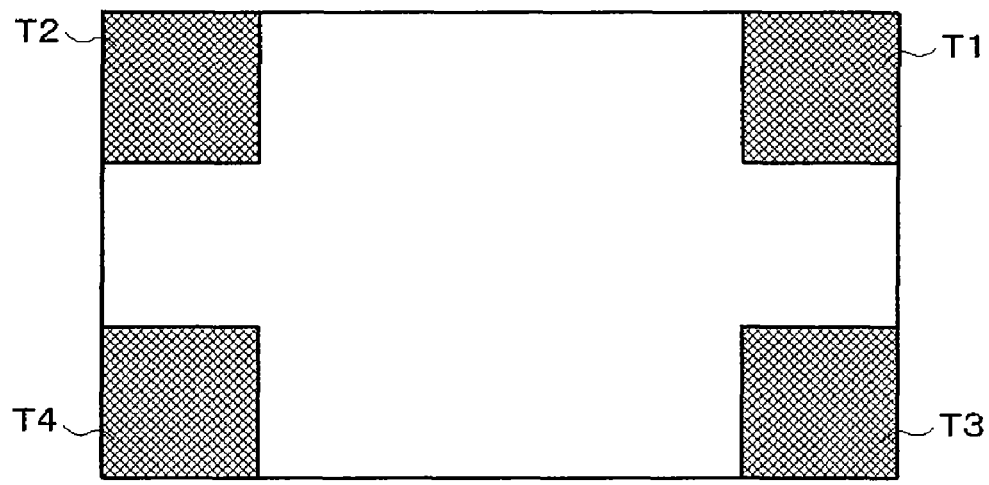
[FIG. 5E] It is an exemplary diagram showing an example of a tire image drawn by the tire drawing unit of the video generation device.

Then, the tire image of FIG. 5E is an example to be generated in a case where the load is imposed in the vertical direction (up or down direction) (in case of running on gravel, etc.).

That is to say, when the load works in the forward direction, the tire drawing unit 206 generates a tire image in which the vertical width of the left and right front tires is elongated (expanded) as shown in FIG. 5B.

In a case where the load works in the rightward direction, the tire drawing unit 206 generates a tire image in which the horizontal width of the front and rear tires on the left is reduced (shrunk) and the horizontal width of the front and rear tires on the right is elongated, as shown in FIG. 5C. Contrarily, in a case where the load works in the leftward direction, the tire drawing unit 206 generates a tire image in which the horizontal width of the front and rear tires on the left is elongated and the horizontal width of the front and rear tires on the right is reduced, as shown in FIG. 5D.

The image processing unit 108 can function as such a tire drawing unit 206.

Figure 6:
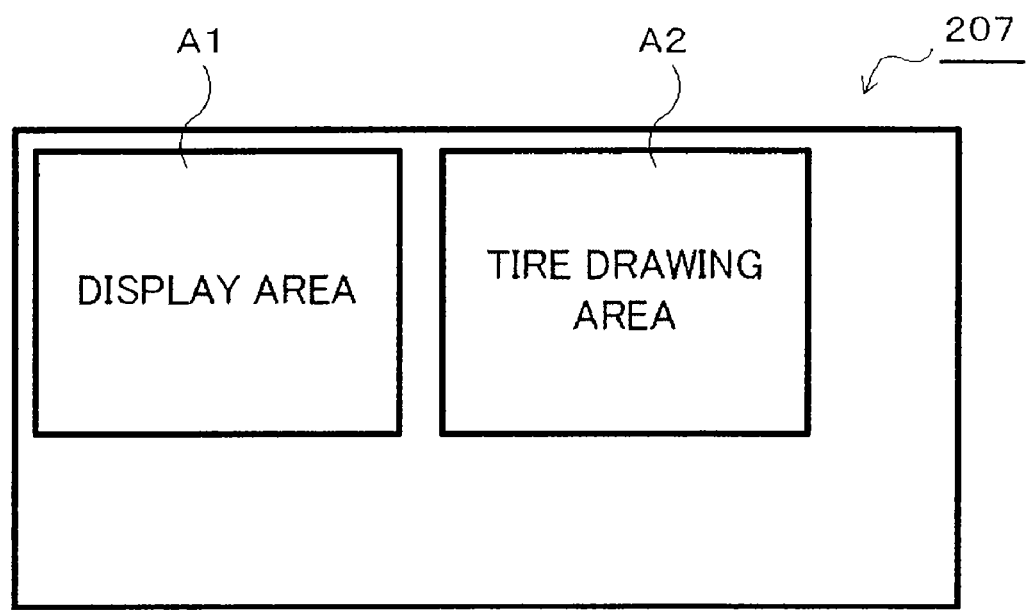
[FIG. 6] It is an exemplary diagram for explaining a display area and a tire drawing area allocated in a frame buffer.

The frame buffer 207 is constituted by a two-dimensional array memory having a predetermined capacity, and has a display area A1, a tire drawing area A2, etc. set therein as shown in FIG. 6.

The display area A1 is an area in which the view field image (driver's view) generated by the above-described video generation unit 204 is written.

The tire drawing area A2 is an area in which the tire image generated by the above-described tire drawing unit 206 is written.

The frame memory provided in the image processing unit 108 can function as such a frame buffer 207.

The display control unit 208 appropriately synthesizes the view field image stored in the display area A1 of the frame buffer 207 with the tire image stored in the tire drawing area A2, and thereafter converts the synthesized image into a predetermined image signal to display the image on an external monitor or the like.

Figure 7:
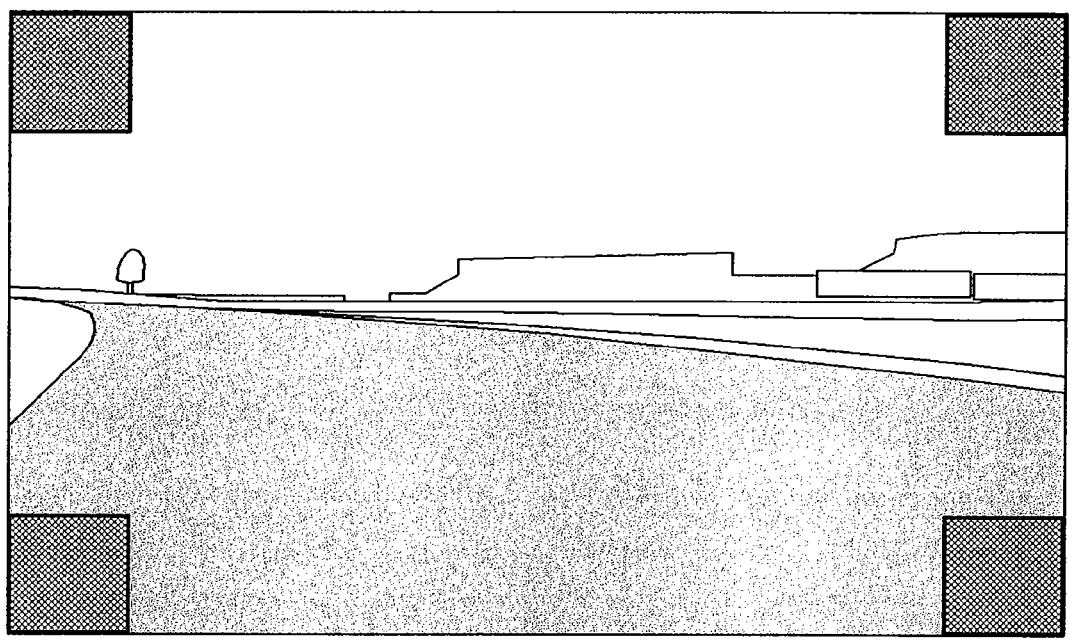
[FIG. 7] It is an exemplary diagram showing an example of a display image on which a view field image and a tire image are synthesized.

For example, in a case where the view field image as shown in FIG. 4 is written in the display area A1 and the tire image as shown in FIG. 5A is written in the tire drawing area A2, the display control unit 208 generates a display image in which the tire image is synthesized at the four corners of the view field image as shown in FIG. 7.

Then, the display control unit 208 converts the display image generated in this manner into a video signal at a predetermined synchronization timing, and supplies it to the external monitor or the like.

The image processing unit 108 can function as such a display control unit 208.

Figure 8:
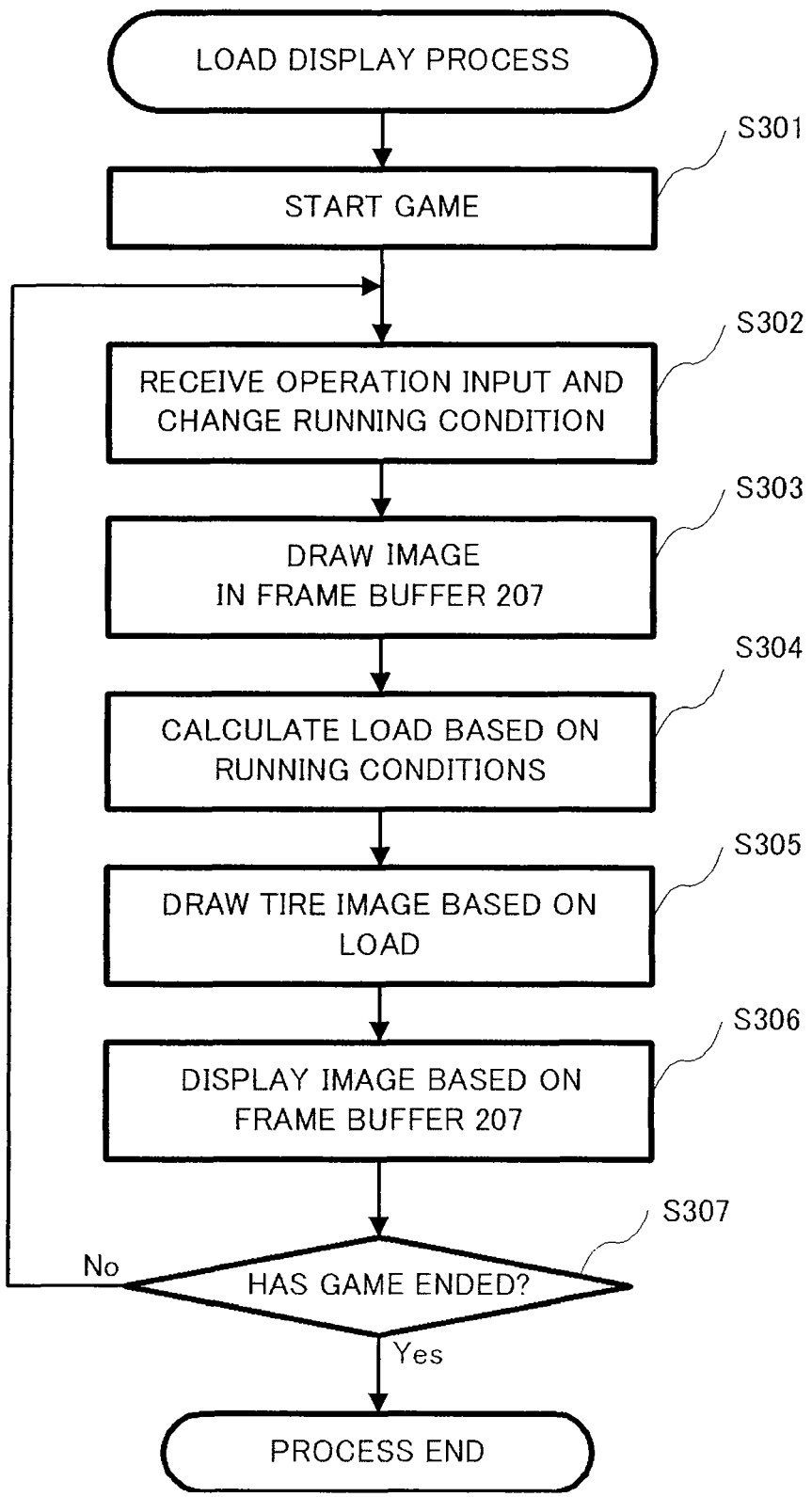
[FIG. 8] It is a flowchart showing a flow of a load display process performed by the video generation device.

FIG. 8 is a flowchart showing the flow of a load display process performed by the video generation device 200. The following explanation will be given with reference to this diagram. Note that this load display process is started synchronously with the game proceeding when a car race game is played.

First, when the car race game is started (step S301), the video generation device 200 receives an operation input and updates the running condition of the racing car (step S302).

Specifically, when the operation input reception unit 201 receives an accelerator operation, a brake operation, a steering wheel operation, a shifter operation, etc. from the user, the running condition managing unit 203 updates the running condition (current position, running direction, velocity, etc.) according to the operations.

The video generation device 200 draws a view field image on the frame buffer 207 (step S303).

Specifically, the video generation unit 204 draws a view field image (driver's view) based on the image information stored in the image information storage unit 202 and the running condition managed by the running condition managing unit 203. Then, the video generation unit 204 writes the drawn view field image in the display area A1 of the frame buffer 207.

The video generation device 200 calculates the load based on the running condition (step S304).

Specifically, the load calculation unit 205 calculates the load (direction and level) imposed on the racing car operated by the user, based on the running condition managed by the running condition managing unit 203.

For example, in a case where the running condition managed is acceleration or deceleration, the load calculation unit 205 calculates the load produced in the forward or backward direction due to an inertia force, and the level thereof. Further, in a case where the running condition managed is turning, the load calculation unit 205 calculates the load produced in the leftward or rightward direction due to a centrifugal force, and the level thereof.

The video generation device 200 draws a tire image based on the calculated load (step S305).

Specifically, the tire drawing unit 206 generates a planar image of tires whose vertical width or horizontal width is deformed according to the load (direction and level) calculated by the load calculation unit 205. Then, the tire drawing unit 206 writes the generated tire image in the tire drawing area A2 of the frame buffer 207.

The video generation device 200 displays the image based on the frame buffer 207 (step S306).

Specifically, the display control unit 208 appropriately synthesizes the view field image stored in the display area A1 of the frame buffer 207 and the tire image stored in the tire drawing area A2, and after this, converts the image into a predetermined image signal, and displays it on the external monitor or the like.

Figure 9A:
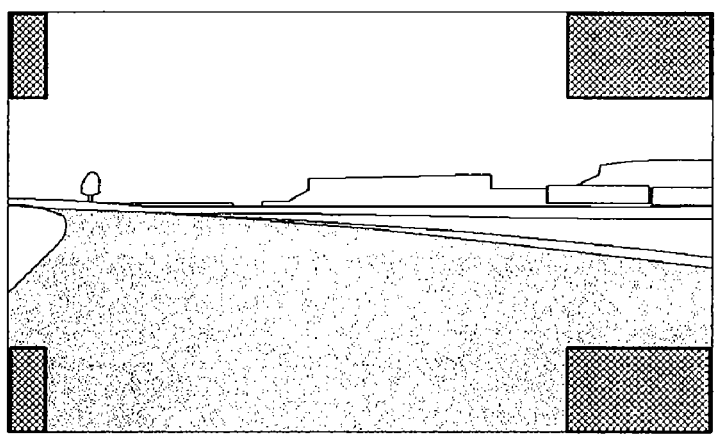
[FIG. 9A] It is an exemplary diagram showing an example of a display image.

For example, when the racing car operated by the user is turning to the left at a corner, a tire image in which the horizontal width of the front and rear tires on the left is shrunk and the horizontal width of the front and rear tires on the right is elongated is displayed together with the view field image, as shown in FIG. 9A. This shows a state that a centrifugal force is produced due to the left turn and this centrifugal force imposes a load in the rightward direction.

That is, the user can feel a load (horizontal G) in the rightward direction, with the width of the tires on the left shrunk and the width of the tires on the right elongated.

Figure 9B:
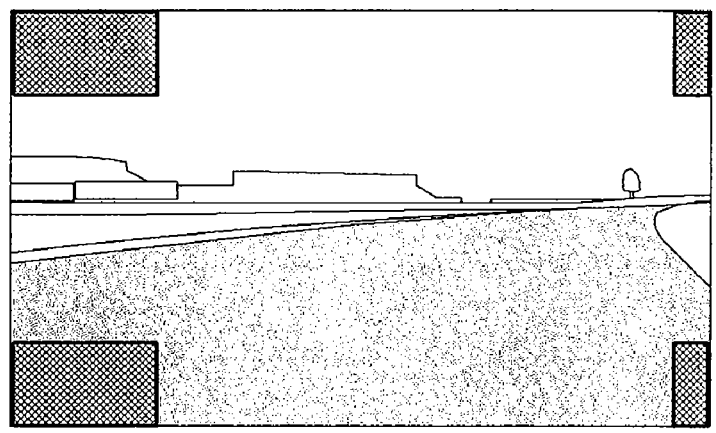
[FIG. 9B] It is an exemplary diagram showing an example of a display image.

Oppositely, in a case where the racing car is turning to the right at a corner, a tire image in which the horizontal width of the front and rear tires on the right is shrunk and the horizontal width of the front and rear tires on the left is elongated is displayed together with the view field image, as shown in FIG. 9B.

That is, the user can feel a load (horizontal G) in the leftward direction, with the horizontal width of the right tires shrunk and the horizontal width of the left tires elongated.

Figure 9C:
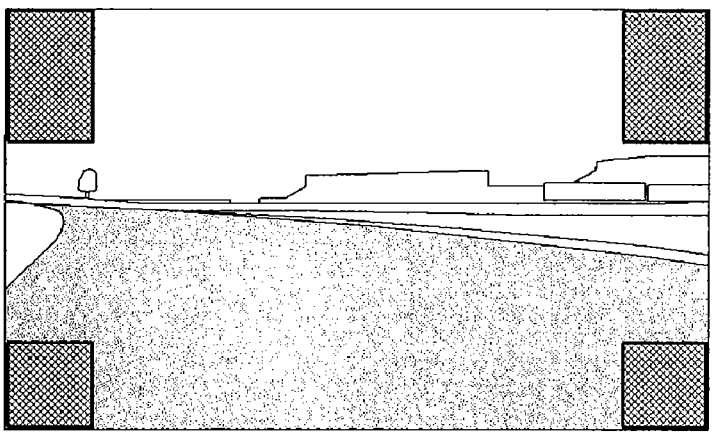
[FIG. 9C] It is an exemplary diagram showing an example of a display image.

Further, when the racing car brakes hard on the course, a tire image in which the vertical width of the front tires on the left and right is elongated is displayed together with the view field image, as shown in FIG. 9C. This shows a state that an inertia force occurs along with the deceleration by braking and this inertia force imposes a load in the forward direction.

That is, the user can feel a load in the forward direction, with the vertical width of the front tires elongated.

Then, the video generation device 200 determines whether or not the game has ended (step S307).

In a case where it is determined that the game has not yet ended, the video generation device 200 returns the process flow to step S302, and repeatedly performs the processes at steps S302 to S207 described above.

On the other hand, in a case where it is determined that the game has ended, the video generation device 200 terminates the load display process.

As described above, according to the present embodiment, it is possible to enable easy grasp of the behaviors of the virtual vehicle, by appropriately visualizing the load according to the running condition.

Another Embodiment

In the above-described embodiment, the case where the load is visualized has been explained. It is also possible to synthesize the view field image by covering it with a mask image and render the peripheral portions of the view field image semitransparent, etc., to visualize the load.

Hereafter, another embodiment of the present invention where the peripheral portions of the view field image are full of mask images to appropriately visualize the load will be explained with reference to the drawings.

Figure 10:
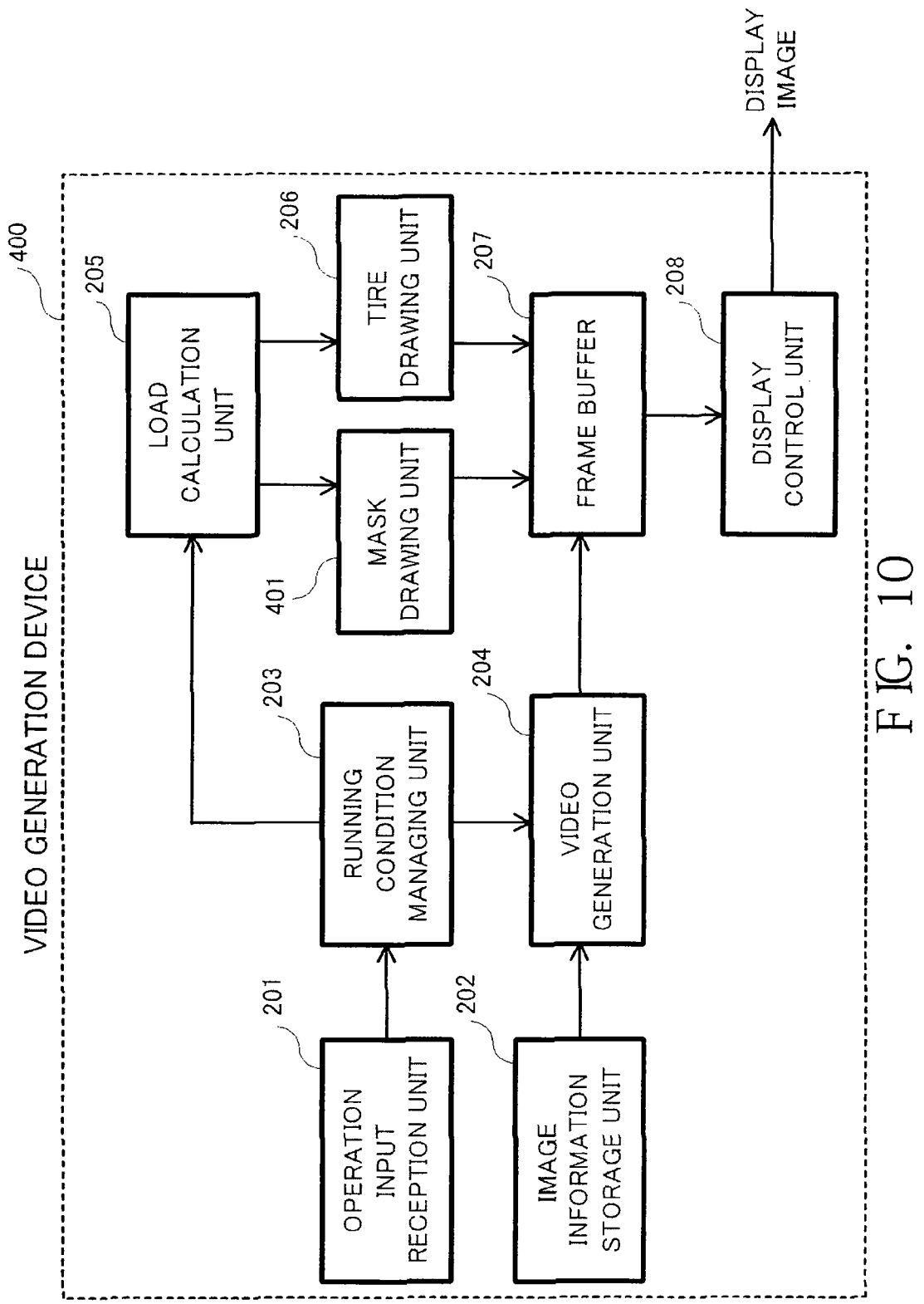
[FIG. 10] It is an exemplary diagram showing a schematic structure of a video generation device according to another embodiment of the present invention.

FIG. 10 is an exemplary diagram showing a schematic structure of a video generation device according to another embodiment.

The video generation device 400 comprises an operation input reception unit 201, an image information storage unit 202, a running condition managing unit 203, a video generation unit 204, a load calculation unit 205, a mask drawing unit 401, a tire drawing unit 206, a frame buffer 207, and a display control unit 208.

That is, this is the video generation device 200 shown in FIG. 2, to which the mask drawing unit 401 is added.

The mask drawing unit 401 generates a frame-like mask image to cover the peripheral portions of the view field image generated by the video generation unit 204. At that time, the mask drawing unit 401 generates a mask image whose shape changes according to the load (direction and level) calculated by the load calculation unit 205. Then, the mask drawing unit 401 writes the generated mask image in the frame buffer 207.

For example, the mask drawing unit 401 generates quadrangular mask images whose size and position of arrangement are different, as shown in FIGS. 11A to 11E.

Figure 11A:
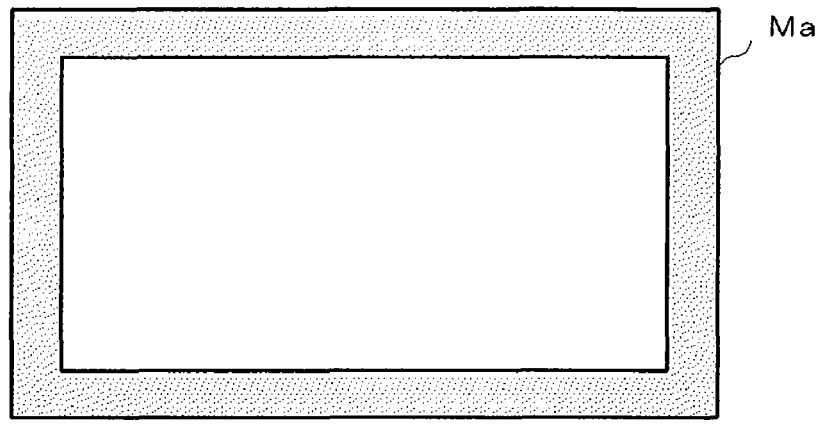
[FIG. 11A] It is an exemplary diagram showing an example of a mask image drawn by a mask drawing unit of the video generation device.

First, the mask image of FIG. 11A is an example to be generated in a case where the load is imposed in the backward direction (in case of constant velocity running or in case of accelerated running). Further, the mask image of FIG. 11B is an example to be generated in a case where the load is imposed in the forward direction (in case of deceleration or sudden stop by braking).

Figure 11B:
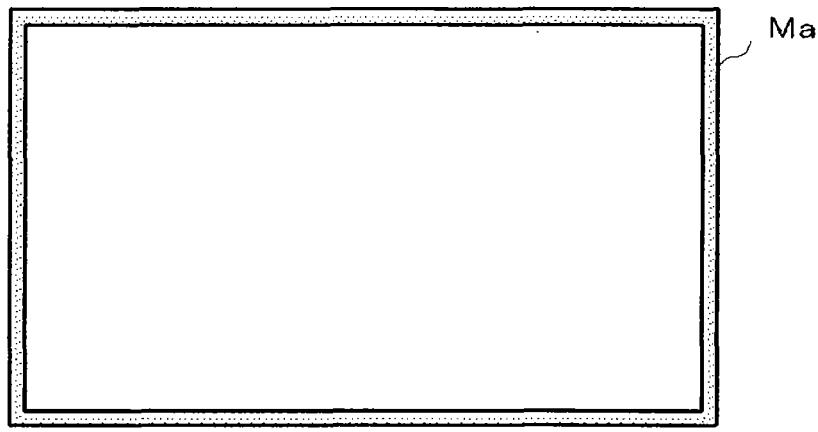
[FIG. 11B] It is an exemplary diagram showing an example of a mask image drawn by the mask drawing unit of the video generation device.
Figure 11C:
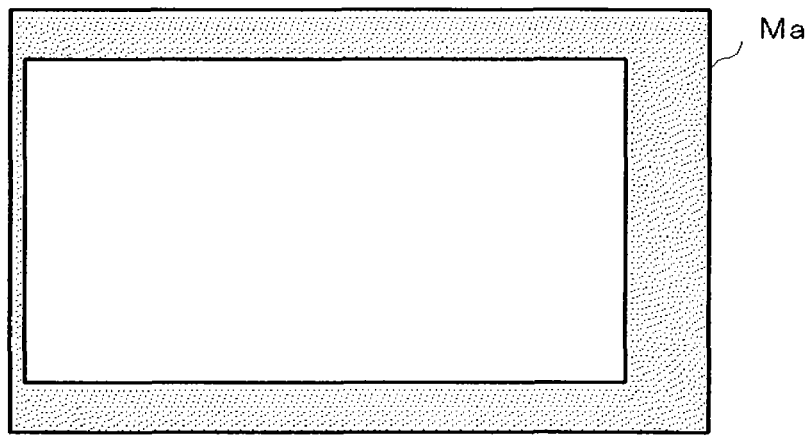
[FIG. 11C] It is an exemplary diagram showing an example of a mask image drawn by the mask drawing unit of the video generation device.

The mask image of FIG. 11C is an example to be generated in a case where the load is imposed in the rightward direction (in case of left turn). Further, the mask image of FIG. 11D is an example to be generated in a case where the load is imposed in the leftward direction (in case of right turn).

Figure 11D:
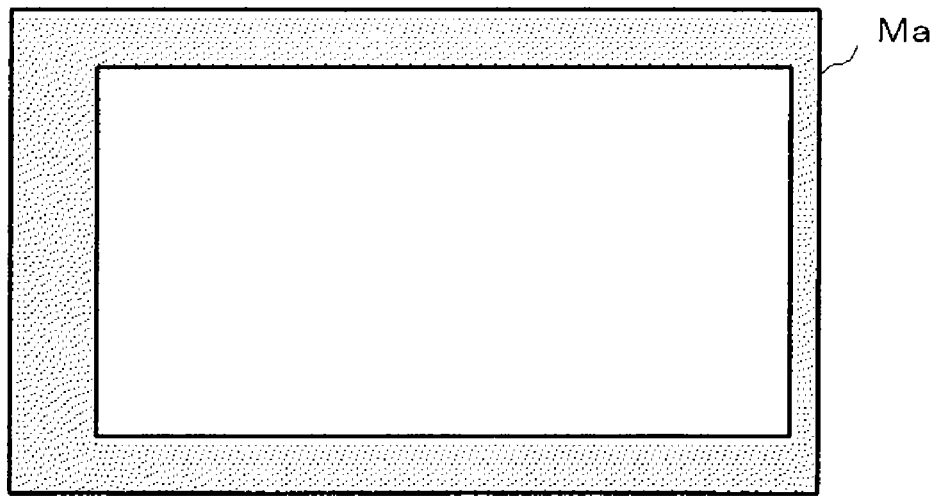
[FIG. 11D] It is an exemplary diagram showing an example of a mask image drawn by the mask drawing unit of the video generation device.
Figure 11E:
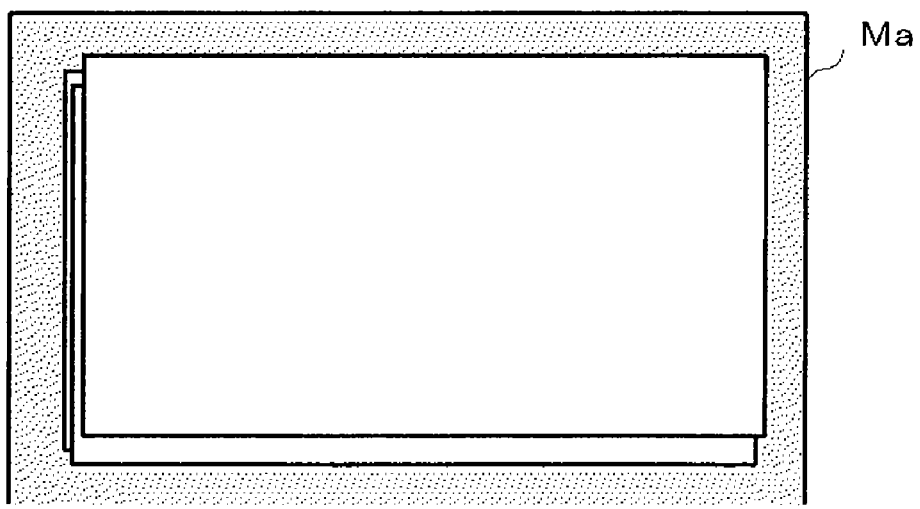
[FIG. 11E] It is an exemplary diagram showing an example of a mask image drawn by the mask drawing unit of the video generation device.

Then, the mask image of FIG. 11E is an example to be generated in a case where the load is imposed in the vertical direction (up or down direction) (in case of running on gravel, etc.).

That is, the mask drawing unit 401 generates a mask image as shown in FIG. 11A in which the width of the four sides is widened when the load is imposed in the backward direction, and generates a mask image as shown in FIG. 11B in which the width of the four sides is narrowed when contrarily the load is imposed in the forward direction.

Further, the mask drawing unit 401 generates a mask image as shown in FIG. 11C in which the width of the left side is narrowed and the width of the right side is widened when the load is imposed in the rightward direction, and generates a mask image as shown in FIG. 11D in which the width of the left side is widened and the width of the right side is narrowed when contrarily the load is imposed in the leftward direction.

The image processing unit 108 can function as such a mask drawing unit 401.

Then, the display control unit 208 synthesizes such a mask image generated by the mask drawing unit 401 and the view field image generated by the video generation unit 204, and renders the peripheral portions of the view field image semitransparent. The peripheral portions may not only be rendered semitransparent, but may be fully painted with the same color or blurred.

Further, the display control unit 208 synthesizes the tire image generated by the tire drawing unit 206 on the view field image whose peripheral portions have been rendered semitransparent or treated in another way.

Thus, images as illustrated in FIG. 12 are displayed on the external monitor or the like.

Figure 12A:
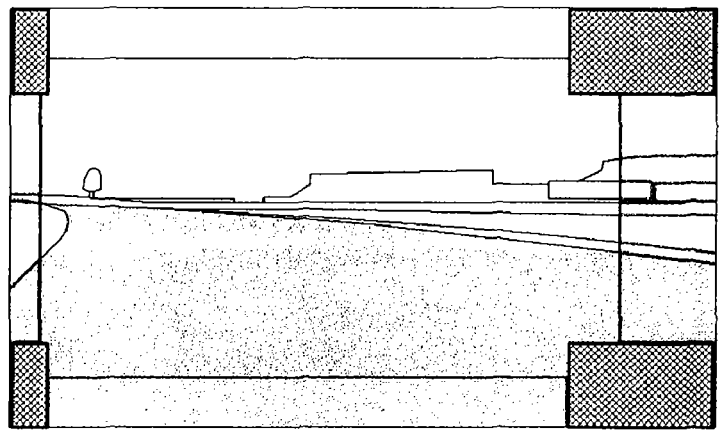
[FIG. 12A] It is an exemplary diagram showing an example of a display image.

First, FIG. 12A is an image displayed in a case where the racing car operated by the user is turning to the left at a corner. That is, a tire image in which the horizontal width of the front and rear tires on the left is shrunk and the horizontal width of the front and rear tires on the right is elongated is displayed, and further, a view field image whose display position is shifted leftward is displayed. This shows a state that a centrifugal force is produced along with the left turn, and this centrifugal force imposes a load in the rightward direction.

With the display position shifted leftward in this manner, the user can feel that a load (horizontal G) in relatively the rightward direction is imposed on him/herself and his/her neck is pulled away to the right.

Figure 12B:
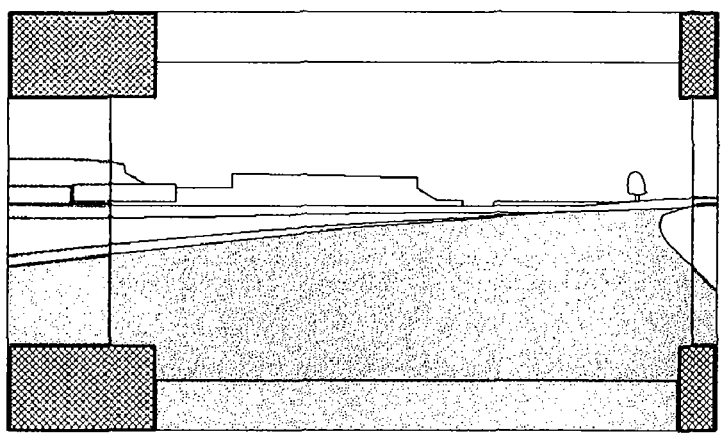
[FIG. 12B] It is an exemplary diagram showing an example of a display image.

Further, FIG. 12B is an image displayed in a case where the racing car is turning to the right at a corner. That is, a tire image in which the horizontal width of the front and rear tires on the right is shrunk and the horizontal width of the front and rear tires on the left is elongated is displayed, and further, a view field image whose display position is shifted rightward is displayed. This shows a state that a centrifugal force occurs along with the right turn, and this centrifugal force imposes a load in the leftward direction.

With the display position shifted rightward in this manner, the user can feel that a load in relatively the leftward direction is imposed on him/herself and his/her neck is pulled away to the left.

Figure 12C:
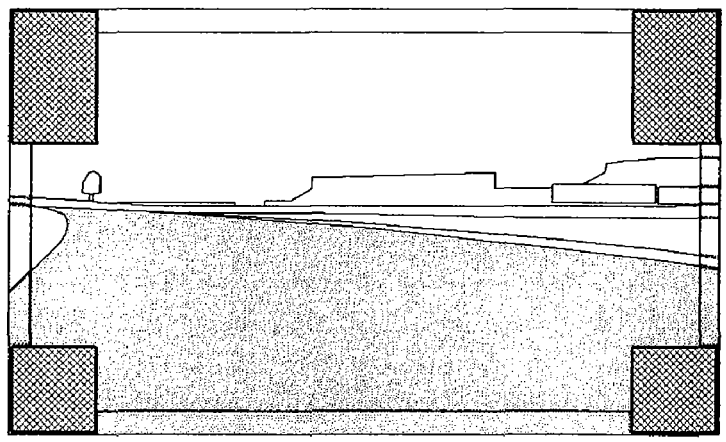
[FIG. 12C] It is an exemplary diagram showing an example of a display image.

And FIG. 12C is an image displayed in a case where the racing car brakes hard on the course. That is, a tire image in which the vertical width of the front tires on the left and right is elongated is displayed, and further, a view field image whose display range is enlarged is displayed. This shows a state that an inertia force is produced along with the deceleration by braking, and this inertia force imposes a load in the forward direction.

With the display range enlarged in this manner, the user can feel that a load in relatively the forward direction is imposed on him/herself and his/her neck is pulled to the front.

As described above, also according to the another embodiment, it is possible to enable easy grasp of the behavior of the virtual vehicle, by appropriately visualizing the load according to the running condition.

In the above-described embodiment, the case where the view field image is displayed with the tire image synthesized at the four corners has been explained. However, the positions at which the tire image is synthesized are not limited to the four corners of the view field image, but arbitrary.

Further, in the above-described embodiment, the case where the shape of the tire image is deformed according to the calculated load has been explained. However, alternatively, the colors, etc. may be changed according to the load.

For example, as the load that can be withstood by the tire grip becomes more about to be reached, the tires may be turned to red to notify the user of the load limit at which a spin or the like occurs.

Further, in the above-described embodiment, the explanation has been made by employing a racing car as an example of the virtual vehicle. However, other vehicles can be used according to the needs, as long as they have tires.

For example, in case of a two-wheeled motorbike that runs in a virtual space, the tire image to be displayed includes two tires, and a center line as an auxiliary line is displayed at the same time. Then, in turning, a tire image in which the horizontal width of the front and rear tires is elongated with the tires deviated from the center line either leftward or rightward is generated and displayed thereby to represent either a leftward or a rightward load.

In this manner, it is possible to enable easy grasp of the behavior of the virtual vehicle by appropriately visualizing the load according to the running condition, even in a case where the invention is applied to a two-wheeled motorbike, etc.

The present application claims priority based on Japanese Patent Application No. 2004-257260, the content of which is incorporated herein in its entirety.

INDUSTRIAL APPLICABILITY

As explained above, according to the present invention, it is possible to provide a video generation device, a load display method, a recording medium and a program which are suitable for easy grasp of the behaviors of a virtual vehicle, with appropriate visualization of a load according to a running condition.

FIG. 1
104 INTERFACE
106 EXTERNAL MEMORY
107 DVD-ROM DRIVE
108 IMAGE PROCESSING UNIT
  TO MONITOR
109 AUDIO PROCESSING UNIT
  TO SPEAKER
  TO INTERNET
FIG. 2
200 VIDEO GENERATION DEVICE
201 OPERATION INPUT RECEPTION UNIT
202 IMAGE INFORMATION STORAGE UNIT
203 RUNNING CONDITION MANAGING UNIT
204 VIDEO GENERATION UNIT
205 LOAD CALCULATION UNIT
206 TIRE DRAWING UNIT
207 FRAME BUFFER
208 DISPLAY CONTROL UNIT
  DISPLAY IMAGE
FIG. 3A
  RUNNING CONDITIONS OF RACING CAR OPERATED BY USER
    CURRENT POSITION
    RUNNING DIRECTION
    VELOCITY
    STEERING ANGLE
    ACCELERATING CONDITION
    DECELERATING CONDITION
    RIGHT TURNING CONDITION
    LEFT TURNING CONDITION
FIG. 3B
  RUNNING CONDITIONS OF OTHER RACING CARS
    VEHICLE ID
    CURRENT POSITION
    RUNNING DIRECTION
    VELOCITY
    STEERING ANGLE
    ACCELERATING CONDITION
    DECELERATING CONDITION
    RIGHT TURNING CONDITION
    LEFT TURNING CONDITION
FIG. 6
A1 DISPLAY AREA
A2 TIRE DRAWING AREA
FIG. 8
  LOAD DISPLAY PROCESS
S301 START GAME
S302 RECEIVE OPERATION INPUT AND CHANGE RUNNING CONDITION
S303 DRAW IMAGE IN FRAME BUFFER 207
S304 CALCULATE LOAD BASED ON RUNNING CONDITION
S305 DRAW TIRE IMAGE BASED ON LOAD
S306 DISPLAY IMAGE BASED ON FRAME BUFFER 207
S307 HAS GAME ENDED
  PROCESS END
FIG. 10
400 VIDEO GENERATION DEVICE
201 OPERATION INPUT RECEPTION UNIT

202 IMAGE INFORMATION STORAGE UNIT
203 RUNNING CONDITION MANAGING UNIT
204 VIDEO GENERATION UNIT
205 LOAD CALCULATION UNIT
401 MASK DRAWING UNIT
206 TIRE DRAWING UNIT
207 FRAME BUFFER
208 DISPLAY CONTROL UNIT
DISPLAY IMAGE

The invention claimed is:

1. A video generation device, comprising:
an operation input reception unit that receives an operation input for a virtual vehicle to be run in a virtual space;
a front image generation unit that generates a front image which appears in front of said virtual vehicle, which runs according to the operation input received
characterized by comprising:
a tire image generation unit that generates a tire image whose shape is changed according to a load so as to represent a tread of the tire, based on a running condition of said virtual vehicle; and
a display control unit that synthesizes the generated front image and the tire image, and displays the synthesized image.

2. The video generation device according to claim 1, wherein said tire image generation unit generates four images that represent front wheels and rear wheels in which a vertical width or a horizontal width of tires is changed according to the load, and
said display control unit synthesizes the four tire images at the four corners of the front image and displays the synthesized image.

3. The video generation device according to claim 1, further comprising:
a running condition managing unit that manages a running condition of said virtual vehicle based on the operation input received by the operation input reception unit;
a load calculation unit which calculates a load to be imposed on said virtual vehicle, based on the running condition managed by the road condition managing unit, wherein
said tire image generation unit generates a tire image whose shape is changed according to the load calculated by said load calculation unit so as to represent a tread of the tire.

4. The video generation device according to claim 3, wherein: said load calculation unit calculates a load to be imposed on said virtual vehicle due to an inertia force in a case where the running condition is acceleration or deceleration, and calculates a load to be imposed on said virtual vehicle due to a centrifugal force in a case where the running condition is turning; and
said tire image generation unit generates four tire images that represent front wheels and rear wheels in which a vertical width or a horizontal width of tires is changed according to the calculated load, and
said display control unit synthesizes the four tire images at the four corners of the front image and displays the synthesized image.

5. The video generation device according to claim 1, further comprising
a mask image generation unit that generates a mask image that is for covering a periphery of the front image generated by said front image generation unit and whose shape is changed according to the load that accords to the running condition of the virtual vehicle;
wherein said display control unit synthesizes the generated front image and the mask image, and after this, further synthesizes the tire image.

6. A load display method using an image information storage unit, said image information storage unit storing image information including a scenery image to be arranged in a virtual space, said method comprising:
an operation input receiving step of receiving an operation input for a virtual vehicle to be run in a virtual space;
a front image generating step of generating a front image which appears in front of said virtual vehicle, which runs according to the received operation input, based on the stored image information;
a tire image generating step of generating a tire image whose shape is changed according to a load so as to represent a tread of the tire, based on a running condition of said virtual vehicle; and
a display controlling step of synthesizing the generated front image and the tire image on a predetermined display device, and displaying the synthesized image thereon.

7. The load display method according to claim 6, further comprising:
a running condition managing step of managing a running condition of said virtual vehicle, based on the received operation input received in said operation input receiving step;
wherein
a load calculating step of calculating a load to be imposed on said virtual vehicle, based on the running condition managed by said running condition managing step, and
said tire image generating step generates a tire image whose shape is changed according to the calculated load calculated in said load calculation step so as to represent a tread of the tire.

8. An information recording medium storing a program for controlling a computer to function as:
an operation input reception unit that receives an operation input for a virtual vehicle to be run in a virtual space;
a front image generation unit that generates a front image which appears in front of said virtual vehicle, which runs according to the received operation input;
a tire image generation unit that generates a tire image whose shape is changed according to a load so as to represent a tread of the tire based on a running condition of said virtual vehicle; and
a display control unit that synthesizes the generated front image and the tire image, and displays the synthesized image.

9. The information recording medium according to claim 8, further controlling a computer to function as:
a running condition managing unit that manages a running condition of said virtual vehicle, based on the operation input received by said operation input receiving unit; and
a load calculation unit that calculates a load to be imposed on said virtual vehicle, based on the running condition managed by said running condition managing unit
wherein
said tire image generation unit generates a tire image whose shape is changed according to the load calculated by the calculating unit so as to represent a tread of the tire.

* * * * *